United States Patent [19]

Konopelski

[11] Patent Number: 5,317,542

[45] Date of Patent: May 31, 1994

[54] SHIP'S ATTITUDE DATA CONVERTER

[75] Inventor: Peter J. Konopelski, Bensalem, Pa.

[73] Assignee: The United States of America as represented by the Secretary of the Navy, Washington, D.C.

[21] Appl. No.: 96,088

[22] Filed: Jul. 21, 1993

[51] Int. Cl.$^5$ .................. G01S 15/00; H04B 17/00
[52] U.S. Cl. ........................................ 367/12; 367/13
[58] Field of Search .................................. 367/12, 13

[56] References Cited

U.S. PATENT DOCUMENTS 4,754,438 6/1988 Erich, Jr. ............................ 367/13
5,077,699 12/1991 Passamante et al. ................. 367/88

Primary Examiner—Daniel T. Pihulic
Attorney, Agent, or Firm—James V. Tura; James B. Bechtel; Susan E. Verona

[57] ABSTRACT

Ship's attitude parameters, including pitch, roll and heading, provided in the form of synchro signals by redundant sensors, are distributed to various shipboard systems by a synchro selector binary switching tree under the control of a digital processor. The processor also generates dynamic simulations of pitch, roll and heading, which can be distributed to the shipboard systems by the switching tree.

13 Claims, 2 Drawing Sheets

SHIP'S ATTITUDE DATA CONVERTER

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

This invention relates generally to shipboard systems, and more particularly to improvements in systems for distribution of electrical signals representing parameters such as heading, roll, pitch and heave to various shipboard systems which utilize the signals. The invention has particular utility in ocean bottom mapping by means of sonar.

Ocean bottom mapping is typically carried out by means of a wide swath array sonar system in which arrays of transmitting transducers (projectors) and receiving transducers (hydrophones) are provided on the underside of the hull of a ship. Typically, the projectors and hydrophones are disposed along perpendicular lines. U.S. Pat. No. 5,077,699, by A. J. Passamante et al., describes a wide swath bottom mapping system in which an array of sonic projectors extends in the fore and aft direction and projects a fan-shaped sonic beam toward the ocean floor. An array of hydrophones, which extends athwartships, is used to receive the echoes of the projected beams, and the signals from the hydrophones are digitally processed to produce a map of the contour of the bottom of a body of water.

In any continuously operated sonar bottom mapping system, it is important to keep track of the ship's heave (the vertical movement of the ship) to make corrections in the data gathered by the sonar system. In a bottom mapping system using orthogonally disposed transmitting and receiving arrays, it is also necessary to keep track of, and make corrections for, pitch, roll and heading, since the gathered data will be affected by these parameters.

Pitch, roll and heading information is ordinarily generated by several redundant systems. Typically the ship is equipped with two Miniature Ship's Inertial Navigation Systems (MINISINS), which are accurate dead reckoning devices utilizing inertial measurement units comprising x and y velocity meters on a gyro-stabilized platform. The x and y velocity meters sense the ship's motion and produce outputs which are converted into computer format by multiplexed encoder circuits in a navigation control console. Changes in the ships heading, and pitching and rolling movements of the ship, manifest themselves as changes in the signals produced by the x and y velocity meters. A computer calculates angular data based- upon the velocity data. The angular data is then used to equalize the platform and is also supplied as outputs representing pitch, roll and heading. These outputs are in the form of polyphase alternating current signals usable by a synchro receiver.

The ship is also typically equipped with a gyrocompass composed of a three-axis, gimbaled platform having synchros on the gimbals to measure platform angles. The platform angles determine pitch, roll and heading, which are also provided as polyphase alternating current signals usable by a synchro receiver.

Heave information is provided by a heave sensing accelerometer, and is converted into vertical displacement by a heave processor, the output of which is in digital form.

Pitch, roll, heading and heave information is utilized by various shipboard systems.

For example, on a ship in which the array of hydrophones extends athwartships, roll data is utilized by a receiver/translator control unit, which sets the gain, bandwidth, sampling delay and sample number for a triple channel acoustic receiver and dual base band translator which provide all of the timing functions for the system. The control unit collects the reflection data sampled by the receiver and combines the reflection data with a sample identifying number and roll data corresponding to the ship's roll at the time the reflection was received.

Pitch data is utilized by a pitch compensator, which provides three signals to be utilized by a pitch resolver. One signal initiates a transmit pulse causes the projectors to operate. Another signal signifies whether the apparatus is operating in a shallow or deep mode. Still another signal controls the phase offset, signal delay and power level for each of the amplifiers which drive the projectors.

In the case in which the projectors are athwartships and the hydrophone array extends in the fore and aft direction, the roll and pitch data may be interchanged.

Heading information is utilized by a current profiler system, which develops and records a velocity profile of the water currents beneath the ship and provides sonar-derived velocity data, including fore-aft, athwartships and vertical components, to a navigation computer. Heading information is also provided to a synchro amplifier, which distributes heading data to various heading indicators, including mission heading indicators, a chart room heading indicator and pilot house heading indicators.

The roll, pitch and heading information is utilized by the receiver/translator control unit, pitch compensator, current profiler and synchro amplifier in the form of polyphase, alternating current, synchro signals.

Roll, pitch and heading data are also utilized, in digital form along with heave data, by a sonar communication computer, a narrow beam sonar system and a navigation computer. The sonar communication computer supplies output ping control data to the transmitting, receiving and test equipment sections of the sonar system, and supplies time-tagged attitude, velocity measurement, status and alarm data to a sonar computer. The narrow beam sonar system provides a single-beam, conventional source of sonar depth data. It is usually operated simultaneously with the wide swath array sonar system to verify proper operation of the latter, and can be used as the primary source of depth data whenever the wide swath array sonar system is not operating. The navigation computer receives inputs from several sensor systems in addition to the roll, pitch, heading and heave data. The data received by the navigation computer is used to determine the ship's "best present position" in terms of latitude and longitude, and the ship's velocity. The navigation computer provides ship's velocity in terms of velocity components in North-South, East-West, fore-aft, port-starboard, and vertical directions.

Ships' attitude data systems previously in use, utilized a large number of manually operable, rotary switches to control the distribution of attitude data throughout the shipboard system. The switching equipment required a large amount of space, and was complex and difficult to operate. To distribute data from a selected source to the various destinations, it was necessary to rotate numerous switches to their proper positions. The procedure was error-prone, since an inadvertent misadjustment of any of the many switches would result in a system discrepancy for example transmission of data from two sources simultaneously.

Another problem with the prior ships' attitude data systems was that they were capable of providing only static simulations. A device known as a "dummy director" was provided to generate synchro signals representing simulated values of roll pitch and heading. The dummy director was a three channel, dual speed digital-to-synchro converters with three thumbwheel switches for selecting values of roll, pitch and heading respectively. The device was used with the complex switching equipment described above, and, unless the rotary switches were operated properly, it was possible to mix simulation signals with actual roll, pitch and heading signals and thereby produce errors.

The principal object of this invention is to provide an improved ship's attitude data system having a simpler and more reliable switching system. Another object is to provide for the elimination of errors resulting from the inadvertent switching of data from multiple sources. Still another object of the invention is to provide a ship's attitude data system in which dynamic simulations of roll, pitch and heading data can be distributed both in analog and digital form simultaneously.

SUMMARY OF THE INVENTION

In accordance with one aspect of the invention, a novel switching system is provided in a shipboard attitude data system comprising multiple, redundant attitude sensor means, each providing a set of analog output signals representative of a plurality of attitude parameters, means for utilizing the output signals, and simulator means for generating a set of simulated attitude sensor output signals, in analog form, for testing purposes. The switching system comprises a tree of binary (i.e. two-position) switches, each having two inputs and one output, for selecting any one of the aforementioned sets of signals and delivering the selected set of signals to the utilizing means. At any given time, one and only one of the sets of signals is delivered to the utilizing means.

In another aspect of the invention, the shipboard attitude data system comprises at least three redundant attitude sensors, each providing analog output signals representative of a plurality of attitude parameters, and means for utilizing the output signals. The switching system comprises first and second two-position switch means. The first switch means receives the output signals of two of the sensors and alternatively delivers the output signals of one or the other of the two sensors to the second two-position switch means. The second two-position switch means receiving the output signals of the third sensor and the output signals delivered by the first switch means and alternatively delivers, to the utilizing means, the output signals of said third sensor, or the output signals delivered by the first switch means. Thus, at any given time, the output signals of not more than one of the sensors are delivered to the utilizing means.

Preferably, where a simulated attitude sensor is provided, the switching system comprises first and second switch means, the first switch means receives the output signals of at least two sensors and is switchable to deliver the output signals of any selected one of the multiple sensors to the second switch means, and the second switch means receives the simulated attitude sensor outputs and the output signals delivered by the first switch means and alternatively delivers, to a utilizing means, the output signal of a selected one of the multiple sensor means, or the simulated attitude sensor outputs.

The invention has several advantages over prior ships' attitude data systems. Among these advantages are the fact that the system in accordance with the invention is much simpler and easier to operate, the fact that it reduces the chance of error, the fact that it provides dynamic as well as static simulation of a ships' attitude parameters, the fact that it provides simulated data in both synchro and digital form.

Other objects, advantages and novel features of the invention will become apparent from the following detailed description of the invention when considered in conjunction with the accompanying drawings wherein:

DESCRIPTION OF THE PREFERRED EMBODIMENTS

Figure 1:
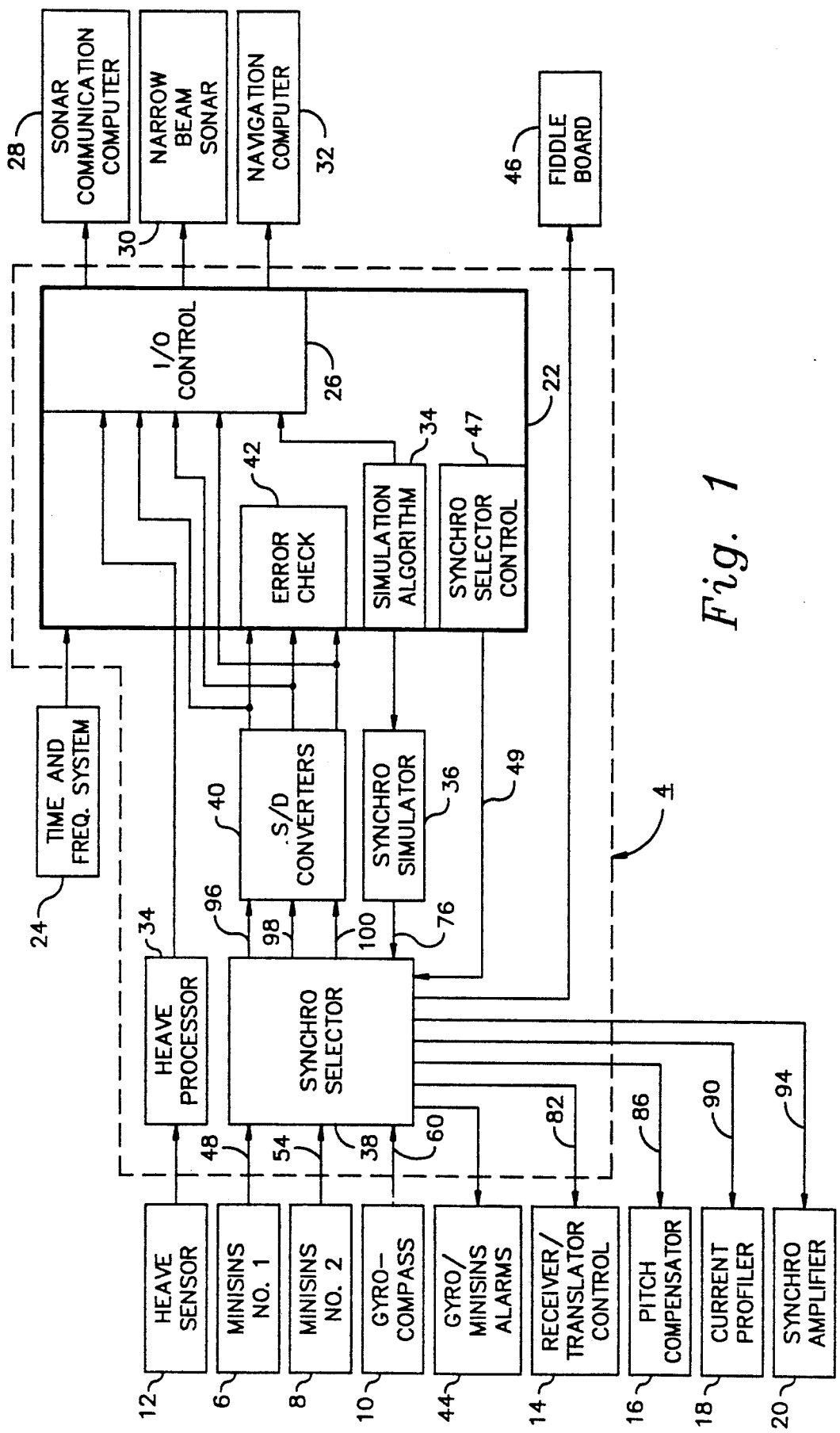
FIG. 1 is a block diagram showing a preferred ship's attitude data converter and communication paths to and from various shipboard sensors and systems.

The ship's attitude data converter is generally indicated in FIG. 1 by reference numeral 4.

Attitude information in the form of synchro signals representing pitch, roll and heading, is provided to converter 4 by redundant miniature ship's inertial navigation systems (MINISINS) 6 and 8, and by gyrocompass 10. Additional attitude information representing heave is provided, in the form of digitally encoded signals, by a heave sensor 12.

The ship's attitude data converter 4 provides roll data, in the form of a synchro signal, to receiver/translator control unit 14. It provides pitch data, also in the form of a synchro signal, to pitch compensator 16. Heading data, in the form of a synchro signal, is provided to a current profiler 18 and to a synchro amplifier 20.

The ship's attitude data converter 4 includes a digital processor unit 22, which is an IBM-compatible industrial computer provided with internal printed circuit boards used to interface with other components of the converter and with other shipboard systems. The processor unit preferably also includes a video display, a floppy disc drive, and both a keyboard and a light pen for control by a human operator.

A time and frequency system 24 generates precise 5 MHz, 1 MHz and 100 KHz signals, 1 PPS pulses, 3 minute mark pulses, and time signals, which are utilized by various shipboard systems, including processor 22.

An input/output (I/O) control section 26 of the processor provides outputs, in digital form, to a sonar communication computer 28, a narrow beam sonar system 30 and a navigation computer 32.

Digitally encoded heave data from heave sensor 12 is converted into vertical displacement by heave processor 34, which is part of converter 4. The I/O control section 26 of processor 22 controls delivery of vertical displacement data to narrow beam sonar system 30 and computers 28 and 32.

Processor 22 is programmed to execute a simulation algorithm, represented by block 34, which produces simulated attitude data in digital form, including pitch, roll, heading and heave data. The algorithm produces a dynamic simulation. The I/O control 26 controls delivery of the simulation data to computers 28 and 32, and to sonar system 30.

Processor 22 also provides an output to a synchro simulator 36, which produces outputs, in the form of dynamically varying synchro signals, representing roll, pitch and heading. The synchro simulator is also provided with its own controls (e.g. thumbwheel switches, not shown) which can be used to select static values of roll, pitch and heading. The roll, pitch and heading signals from the synchro simulator 36 are delivered to a synchro selector 38, which also receives synchro signals from MINISINS 6 and 8 and from gyrocompass 10. The synchro selector provides outputs, as synchro signals, to receiver/translator control 14, pitch compensator 16, current profiler 18 and synchro amplifier 20.

Synchro signals from MINISINS 6 and 8 and from gyrocompass 10 are passed through synchro selector 38 to synchro-to-digital (S/D) converters 40, which convert the synchro signals representing roll, pitch and heading to digital format for use and display by processor 22. The outputs of converters 40 are provided to an error checking section 42 of processor 22 and to the input/output control section 26 of the processor. The error checking section verifies the roll, pitch and heading values received from the three sensors 6, 8 and 10 by comparing the outputs of each sensor with the outputs of the others.

Synchro selector 38 comprises a set of relays which are used to switch the synchro outputs of MINISINS 6 and 8, gyrocompass 10 and synchro simulator 36.

Each of the synchro sources (MINISINS 6 and 8, and gyrocompass 10) produces an alarm signal when it fails. When attitude data is being distributed from a particular source, and that source fails, its alarm signal is sent by selector 38 to gyro/MINISINS alarm panel in the pilot house and to fiddle board 46, which is an alarm and status panel for the system operators.

Figure 2:
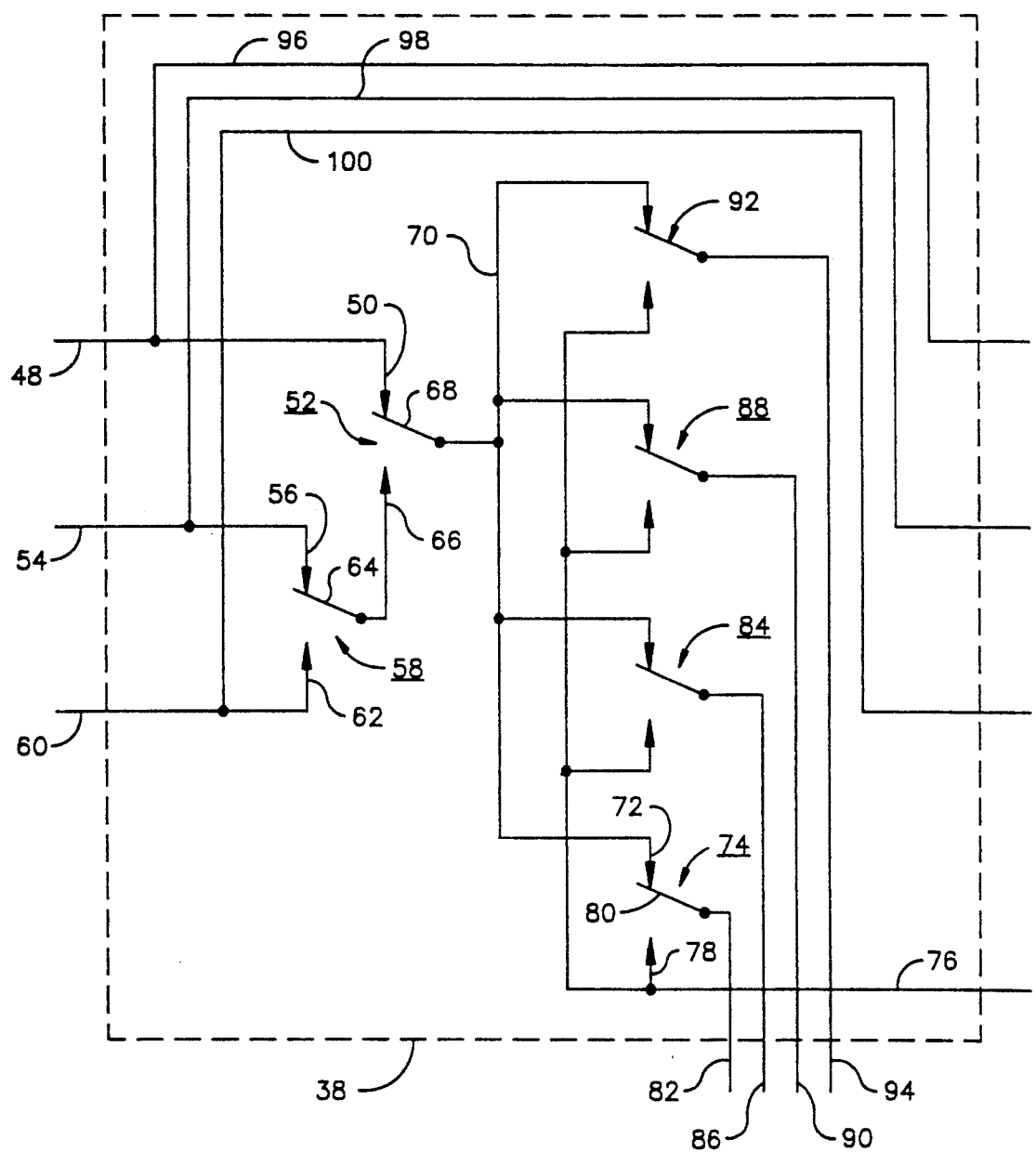
FIG. 2 is a simplified schematic diagram illustrating the structure and operation of a component of a synchro selector, which is a component of the ship's attitude data converter.

The switching within synchro selector 38 is illustrated, in simplified form, in FIG. 2, and it should be understood that each set of single pole, double throw switches shown in FIG. 2 may represent multiple sets of switches. The switches are relays controlled by signals delivered from the synchro selector control section 47 of processor 22 through path 49 (FIG. 1). These multiple switches are needed to switch the polyphase synchro signals for roll, pitch and heading for each of four data source, as well as reference signals, which represent one constant phase of the polyphase synchro signal for each synchro source (MINISINS 6 and 8 and gyrocompass 10). The reference signals are used to calculate the phase changes produced by the synchro sources.

The synchro outputs and reference signals from MINISINS 6 are delivered, through path 48, to normally closed contacts 50 of switches 52. The synchro outputs and reference signals from MINISINS 8 are delivered, through path 54, to normally closed contacts 56 of switches 58. The synchro outputs and reference signals from gyrocompass 10 are delivered, through path 60, to normally open contacts 62 of switches 58. The movable contacts 64 of switches 58 are connected to the normally open contacts 66 of switches 52.

The movable contacts 68 of switches 52 are connected to a bus 70 from which selected signals are tapped. For example, roll and reference signals are delivered to normally closed contacts 72 of switch 74. Pitch, roll, heading and reference signals from the synchro simulator 36 (FIG. 1) are delivered through bus 76, and selected signals are tapped off from bus 76. For example, simulated roll and reference signals from the bus are tapped and delivered to normally open contacts 78 of switches 74. The movable contacts 80 of switches 74 deliver roll and reference signals, through path 82, to receiver/translator control 14 (FIG. 1).

In a similar way, pitch and reference signals from the sensors, or simulated pitch and reference signals, are selected by switch 84 and delivered through path 86 to pitch compensator 16. Heading and reference signals from the sensors, or simulated heading and reference signals, are selected by switch 88 and delivered through path 90 to current profiler 18. Heading and reference signals from the sensors, or simulated heading and reference signals, are also selected by switch 92 and delivered through path 94 to current profiler 20.

The synchro signals from sensors 6, 8 and 10 are passed through synchro selector 38, in paths 96, 98 and 100, to synchro-to-digital converters 40. The digital signals from the synchro-to-digital converters are switched within the input-output control section 26 of processor 22 by the same instruction which causes synchro selector control 47 to provide a signal to synchro selector 38. Thus, while analog attitude signals, in synchro form, are switched by synchro selector 38 for use by the receiver/translator control, pitch compensator, current profiler and synchro amplifier, digital attitude signals are switched in the input-output control section for use by the sonar communication computer, narrow beam sonar and navigation computer.

In the operation of the ship's attitude data converter, an operator can select any one of the several sources of ship's attitude data through a keyboard or light pen control at the processor console. Data from the selected source, e.g. the MINISINS 6, is switched by the synchro selector, and by the input/output section of the processor, so that all of the ship's systems utilize data from the same source. Alternatively, the operator can select simulation, and cause simulated attitude data, either static or dynamic, to be distributed to the various ship's systems.

Particularly by virtue of the switching tree controlled by the synchro selector control section of the processor, the ship's attitude data converter described herein is simpler, easier to operate, and more reliable than prior systems. Switching of data is fail-safe, because the binary switching tree make it impossible to distribute attitude data from two sources simultaneously. The system of the invention is also advantageous in that it is capable of providing digitally generated dynamic simulation, as well as static simulation, of a ships' attitude parameters for testing.

Various modifications can be made to the apparatus described. For example, while the apparatus is described in the context of a ship utilizing attitude sensors delivering analog data in synchro form, the same principles are applicable to the distribution of attitude data in the form of resolver outputs or in the form of outputs of potentiometric transducers operating on alternating or direct current. Although the system described utilizes three redundant attitude sensors, it is possible to distribute data produced by more or fewer sensors. Different switching tree configurations can be utilized. For example, in the case of four redundant sensors, it is possible to make a first selection of one or the other of two of the sensors, and a second selection of one or the other of the two remaining sensors, and then a final selection from one or the other of the first two selections. Alternatively, a first selection could be a choice of one or the other of two of the four sensors, a second selection could be a choice of the first selection or a third sensor, and a third selection could be a choice of the second selection or a fourth sensor. While electromechanical relays are preferably used, as an alternative, switching can be carried out electronically.

Many modifications and variations of the present invention are possible in view of the above disclosure. It is therefore to be understood that, within the scope of the appended claims, 10 the invention may be practiced otherwise than as specifically described.

I claim:

1. In a shipboard attitude data system comprising multiple, redundant attitude sensor means, each sensor means providing a set of analog output signals representative of a plurality of attitude parameters, means for utilizing said output signals, and simulator means for generating a set of simulated attitude sensor output signals, in analog form, for testing purposes, a switching system comprising:

switching means, comprising a tree of binary switches, each having two inputs and one output, for selecting any one of said sets of signals and delivering the selected set of signals to said utilizing means;

whereby, at any given time, one and only one of said sets of signals is delivered to said utilizing means.

2. A shipboard attitude data system according to claim 1 in which said analog signals are polyphase alternating current signals.

3. A shipboard attitude data system according to claim 1 in which said analog signals are in the form of synchro output signals.

4. A shipboard attitude data system according to claim 1 including processor means for controlling the selection made by said switching means.

5. A shipboard attitude data system according to claim 1 including digitizing means for converting the analog output signals from said sensor means to digital form, additional means for utilizing said output signals from said sensor means, and means for delivery of the converted analog output signals from said digitizing means to said additional utilizing means.

6. A shipboard attitude data system according to claim 1 including a digital processor, and in which said simulator means comprises means, within said digital processor, for generating simulated attitude sensor signals in digital form, and means for converting said simulated attitude sensor signals from digital form to analog form for delivery to said utilizing means.

7. A shipboard attitude data system according to claim 1 in which said simulator means comprises a digital processor and means, within said digital processor, for generating simulated attitude sensor signals in digital form; and including means for converting said simulated attitude sensor signals from digital form to analog form for delivery to said utilizing means; digitizing means for converting the analog output signals from said sensor means to digital form; additional means for utilizing said output signals from said sensor means; means for delivery of the converted analog output signals from said digitizing means to said additional utilizing means; and means for delivering said simulated sensor signals, in digital form, to said additional utilizing means.

8. In a shipboard attitude data system comprising three redundant attitude sensor means, each sensor means providing analog output signals representative of a plurality of attitude parameters, and means for utilizing said output signals, a switching system comprising:

first and second two-position switch means, the first switch means receiving the output signals of two of said sensor means and alternatively delivering the output signals of one or the other of said two of said sensor means to the second two-position switch means, and the second two-position switch means receiving the output signals of the third sensor means and the output signals delivered by said first switch means and alternatively delivering, to said utilizing means, the output signals of said third sensor means, or the output signals delivered by said first switch means, whereby, at any given time, the output signals of not more than one of said sensor means are delivered to said utilizing means.

9. A shipboard attitude data system according to claim 8 in which said output signals are polyphase alternating current signals.

10. A shipboard attitude data system according to claim 8 in which said output signals are in the form of synchro output signals.

11. A shipboard attitude data system according to claim 8 including processor means for controlling the selection made by said switching means.

12. A shipboard attitude data system according to claim 8 including simulator means for generating simulated attitude sensor outputs for testing purposes, and third switch means for receiving the signals delivered by said second two-position switch means and the outputs of said simulator means and alternatively delivering, to said utilizing means, the output signal of a selected one of said sensor means or the simulated attitude sensor outputs.

13. In a shipboard attitude data system comprising multiple, redundant attitude sensor means, each sensor means providing analog output signals representative of a plurality of attitude parameters, means for utilizing said output signals, and simulator means for generating simulated attitude sensor output for testing purposes, a switching system comprising:

first and second switch means, said first switch means receiving the output signals of at least two of said sensor means, and being switchblade to deliver the output signals of any selected one of said multiple sensor means to said second switch means, and the second switch means receiving the simulated attitude sensor outputs and the output signals delivered by said first switch means and alternatively delivering, to said utilizing means, the output signal of a selected one of said multiple sensor means, or the simulated attitude sensor outputs.

* * * * *